United States Patent
Oliver

[15] 3,703,267
[45] Nov. 21, 1972

[54] CONTROL WHEEL FORCE SENSORS
[72] Inventor: Kenneth L. Oliver, Phoenix, Ariz.
[73] Assignee: Sperry Rand Corporation
[22] Filed: Feb. 18, 1971
[21] Appl. No.: 116,334

[52] U.S. Cl. ..............................................244/83 E
[51] Int. Cl.............................................B64c 13/04
[58] Field of Search..................244/83 R, 83 B, 83 E

[56] References Cited

UNITED STATES PATENTS

| | | | |
|---|---|---|---|
| 2,945,648 | 7/1960 | Oplinger et al | 244/83 E |
| 3,251,013 | 5/1966 | Klem et al. | 244/83 E |
| 3,447,766 | 6/1969 | Palfreyman | 244/83 E |
| 3,620,073 | 11/1971 | Robbins | 244/83 R |

Primary Examiner—Milton Buchler
Assistant Examiner—Carl A. Rutledge
Attorney—S. C. Yeaton

[57] ABSTRACT

A mechanism disposed within the hub of an aircraft control wheel including pitch and roll flexure devices which act as the primary restraints to loads applied to the control wheel and a plurality of load beams that function as redundant sensors which react to a minimal percentage of the applied load. Bearing surfaces between the pitch and roll flexure devices effectively isolate the pitch flexures and beams from the load flexures and beams thereby eliminating cross-coupling between these devices in reacting to pilot initiated pitch and roll commands. Transducers affixed to the pitch and roll beams transform mechanical displacements produced in the beams into electrical output command signals which are used to control the aircraft attitude.

10 Claims, 6 Drawing Figures

INVENTOR
KENNETH L. OLIVER
BY
ATTORNEY

INVENTOR
KENNETH L. OLIVER
BY
H P Terry
ATTORNEY

INVENTOR
KENNETH L. OLIVER
BY
ATTORNEY

CONTROL WHEEL FORCE SENSORS

BACKGROUND OF THE INVENTION

1. Field of the Invention

The subject invention pertains to aircraft control devices and specifically to apparatus which functions in cooperation with the control wheel to translate pilot applied pitch and roll commands into appropriate electrical output signals to control the aircraft attitude.

2. Description of the Prior Art

In the prior art an aircraft control wheel force sensing device used a pair of conventional E-transformers mounted within the hub to sense pitch and roll displacements between spring restrained members in the wheel. The spring restraints isolated the roll and pitch members so that upon application of an axial force on the wheel only pitch command signals were produced and upon application of a tangential force on the wheel only roll command signals were produced. The E-transformer for sensing axial forces was aligned to the axis of the control column and its armature was attached to the wheel. With no force applied to the wheel, the transformer outputs from each secondary winding are equal. However, upon application of an axial force to the wheel, the relative position of the armature to the E-transformer was varied thereby producing an unbalance in the secondary winding in accordance with the applied force. The E-transformer for sensing tangential forces was aligned in a plane perpendicular to the axis of the control column with its armature located on a stationary rear wheel cover which was firmly fixed to the control column. When no tangential force was applied to the wheel, the three outputs from the secondary winding of the E-transformer were equal. However, upon application of a tangential load, the position of the E-transformer was varied relative to the armature thereby producing an unbalance in the secondary winding in accordance with the applied force. The E-transformers and armatures are variable reluctance devices which are inherently non-linear due to limitations of state of the art construction techniques. Further, current standards require control wheel force sensors and transducers to provide redundant output signals as a safety measure. The construction of a mechanism to produce redundant outputs using the aforementioned prior art devices results in enlarged control wheel hubs that reduce the pilot's view of the instrument panel. In addition, the non-linear characteristics of the E-transformers create problems of tracking between the plurality of transformers.

Other prior art devices include a plurality of primary flexure elements which react to pilot applied forces about the pitch and roll axes. Strain gage devices affixed to the primary flexure elements are operated near or at their maximum strain level often resulting in null shifts which require recalibration of the strain gages. Further, joints in the assemblies produce hysteresis effects in the flexure elements which cause degradation in the accuracy of the electrical output signals provided by the strain gages.

SUMMARY OF THE INVENTION

The subject invention is a plurality of flexure devices and load beams mounted within the hub of an aircraft control wheel used for sensing the forces applied to the wheel by the pilot. Primary pitch and roll flexures react to a substantial portion of the applied load and pitch and roll load beams react to the remaining minimal portion of the applied load. The primary pitch flexure is a cylindrical member with a mounting flange at one end that is rigidly secured to the hub of the control wheel. Near the end of the cylindrical member opposite the flange a plurality of curved beams are machined into the member. One end of a torsion bar which serves as the primary roll flexure is pinned to the pitch flexure at the end opposite the flange and the other end is firmly affixed to the control column. The primary pitch flexure has 2° of freedom (pitch and roll) at the flange mounted end and 1° of freedom (roll) at the opposite end. Therefore, the pitch flexure reacts only to loads applied parallel to the axis of the wheel hub and control column thereby eliminating cross-coupling from the roll flexure into the pitch flexure. Bearings disposed between the torsion bar and inner surface of the cylindrical member isolate the roll flexure from the pitch flexure. Tangential forces applied to the control wheel are transmitted through the mounting flange and pitch flexure to the pinned end of the torsion bar. Therefore, the roll flexure reacts only to tangentially applied loads thereby eliminating cross-coupling from the pitch flexure into the roll flexure. An assembly of cantilevered pitch load beams are connected to the pitch flexure so that they bridge the curved beams machined in the cylindrical member. A plurality of cantilevered load beams are coupled to the torsion bar at the end pinned to the pitch flexure and are connected to the torsion bar at the end firmly affixed to the control column. Transducers attached to the pitch and roll load beams transform the redundant mechanical displacements of the beams resulting from pilot applied pitch and roll loads into redundant electrical output signals which control the aircraft. The subject invention provides a compact device which can provide redundant pitch and roll output control signals and still fit within the hub of a control wheel without obscuring the pilot's view of the control panel. Further, the pitch and roll load beams may be replaced individually without necessitating a complicated alignment or calibration procedure thereby providing an improvement in serviceability.

DESCRIPTION OF THE PREFERRED EMBODIMENT

Figure 1:
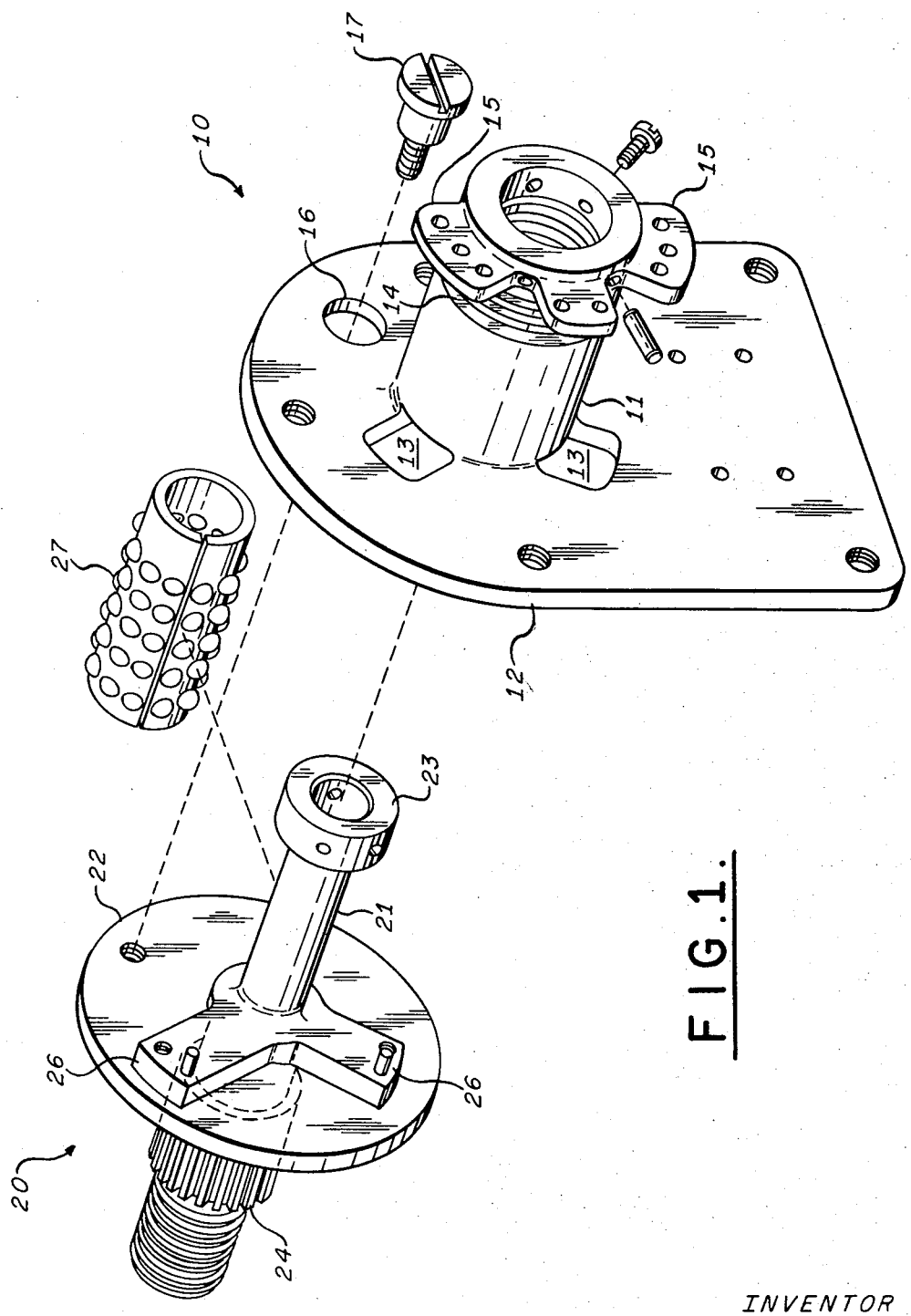
FIG. 1 is an isometric view of the primary pitch and roll flexure used in the invention.
Figure 4:
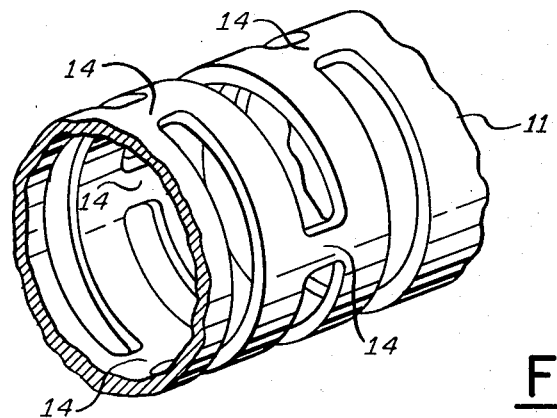
FIG. 4 is an isometric view of curved beams machined in a section of the pitch flexure.

The invention will now be described with reference to the drawings. In FIG. 1, a pitch flexure 10 has a cylindrical member 11 with a mounting flange 12 at one end having two rectangular openings 13. A plurality of curved beams 14 are machined in the cylindrical member 11 near the end opposite the mounting flange 12 as shown in FIG. 4 and smaller mounting flanges 15 are fixed at the end opposite the mounting flange 12. Also shown in FIG. 1 is a roll flexure 20 which has a hollow torsion bar 21 disposed between a mounting plate 22 and a collar 23. Adjacent the mounting plate 22 is a section of a male spline 24 which is used to rigidly connect the roll flexure 20 to a control column. Two raised sections 26 on the mounting plate 22 fit into the two rectangular openings 13 in the mounting flange 12 when the pitch flexure 10 and the roll flexure 20 are assembled. Further, the collar 23 is pinned to the pitch flexure 10 at the end opposite the mounting flange 12 and linear roller bearings 27 are inserted between the outer surface of the torsion bar 21 and the inner surface of the cylindrical member 11 which prevents the flange 12 from twisting and pivoting about the curved beams 14. The bearings restrict the motion of the flange 12 to pure translation and pure torsion when any combination of loads are applied to the flange 12.

Figure 2:
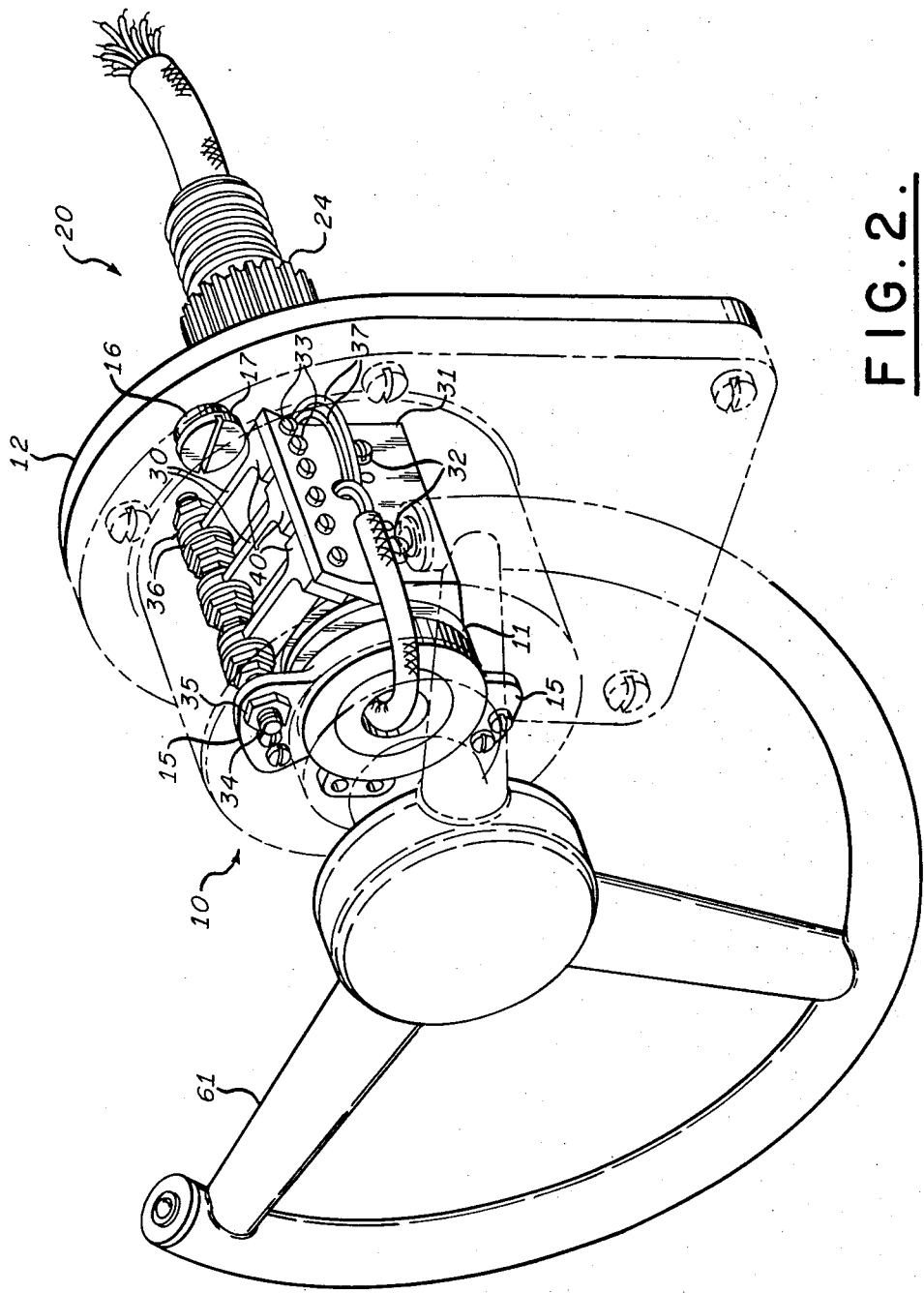
FIG. 2 is an isometric view of the pitch load beams shown mounted to the assembly of the primary pitch and roll flexures.
Figure 5:
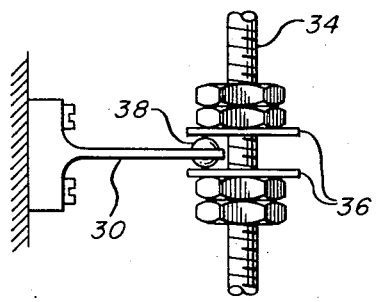
FIG. 5 is a detail drawing of a cantilevered load beam illustrating the adjustable limit stops.

In FIG. 2, the roll flexure 20 is inserted into the pitch flexure 10 and three cantilevered pitch load beams 30 are shown assembled to the pitch flexure 10. A mounting plate 31 is attached by screws 32 to the cylindrical member 11. One end of each of the three cantilevered pitch load beams 30 is rigidly mounted to the mounting plate 31 by screws 33. Each of the free ends of the beams 30 has a hole in which a small ball 38 is inserted with equal amounts of the ball protruding on each side of the beam as shown in FIG. 5. The ball 38 on the free end of the beam is positioned between two flat nuts 36 which are positioned at predetermined locations along a threaded shaft 34 and serve as limit stops for the free ends of the beams 30. The threaded shaft 34 is secured by nuts 35 to one of the smaller mounting flanges 15. A plurality of wires 37 conduct the electrical output signals from the pitch strain gages 40 through the hollow torsion bar 21 to a signal processing unit (not shown).

Figure 6:
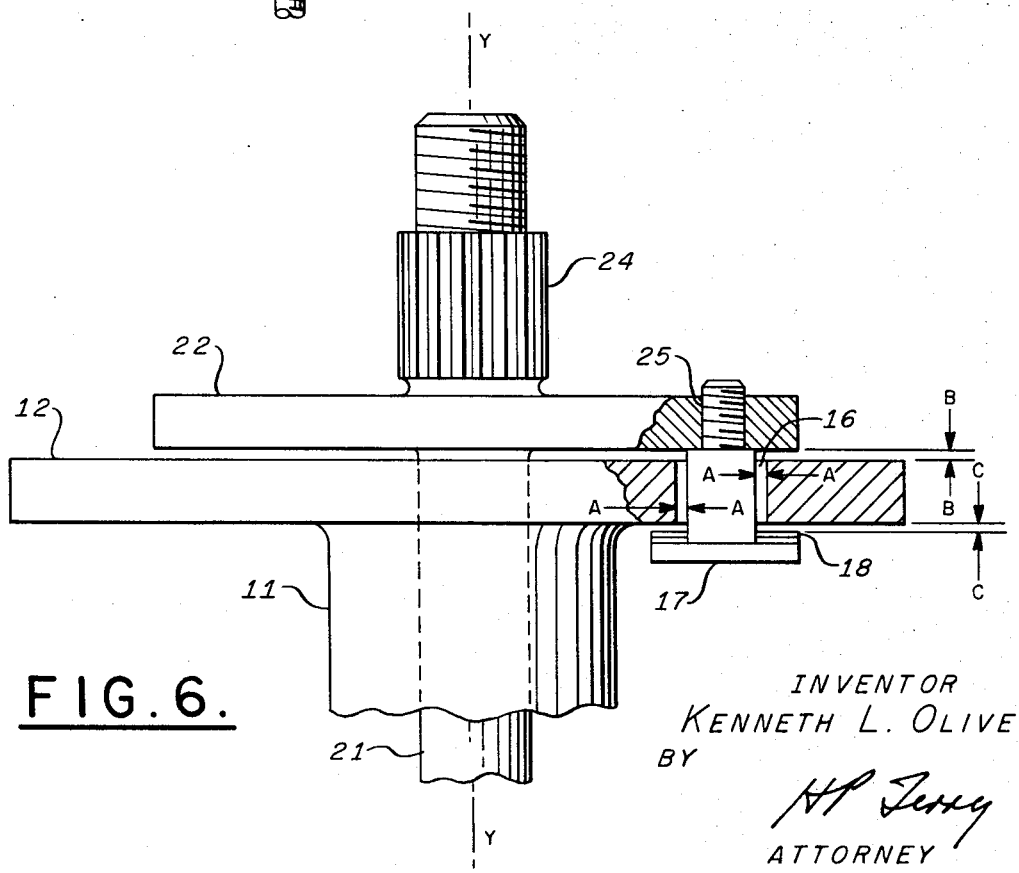
FIG. 6 is a detail drawing of the hard stop member shown inserted in the mounting flange.

FIG. 6 shows a stop member 17 having a threaded section in contact with a threaded hole 25 in mounting plate 22. The stop member 17 has a machined surface adjacent the threaded section disposed within a clearance hole 16 also having a machined surface located in mounting flange 12. The radial distance between the two circular machined surfaces establishes a clearance distance A—A. A clearance distance B—B between the adjacent flat surfaces of the mounting flange 12 and the mounting plate 12 is established prior to pinning the collar 23 to the cylindrical member 11. A second clearance distance C—C between the other flat surface of the mounting plate 12 and the adjacent flat surface of the stop member 17 is established by adding shims 18 under the head of the stop member 17. When a maximum pitch down load is applied to the control wheel 61, the mounting plate 12 translates along the coincident axis Y—Y of the torsion bar 21 and the cylindrical member 11 decreasing the distance B—B until the adjacent surfaces come in contact thereby providing a pitch down hard stop limit. Alternately, when a maximum pitch up load is applied to the control wheel 61, the mounting plate 12 again translates along the axis Y—Y decreasing the distance C—C until the mounting plate 12 comes in contact with the shims 18 thereby providing a pitch up hard stop limit.

Application of a maximum roll load to the mounting plate 12 causes the plate 12 to rotate about the coincident axis Y—Y while the mounting flange 22 which is rigidly coupled to the stationary control column 62 (see FIG. 3) remains fixed. As a result, a portion of the machined surface of the hole 16 moves toward a portion of the machined surface of the stop member 17 decreasing the radial distance therebetween until the surfaces make contact thereby providing a roll hard stop limit.

Figure 3:
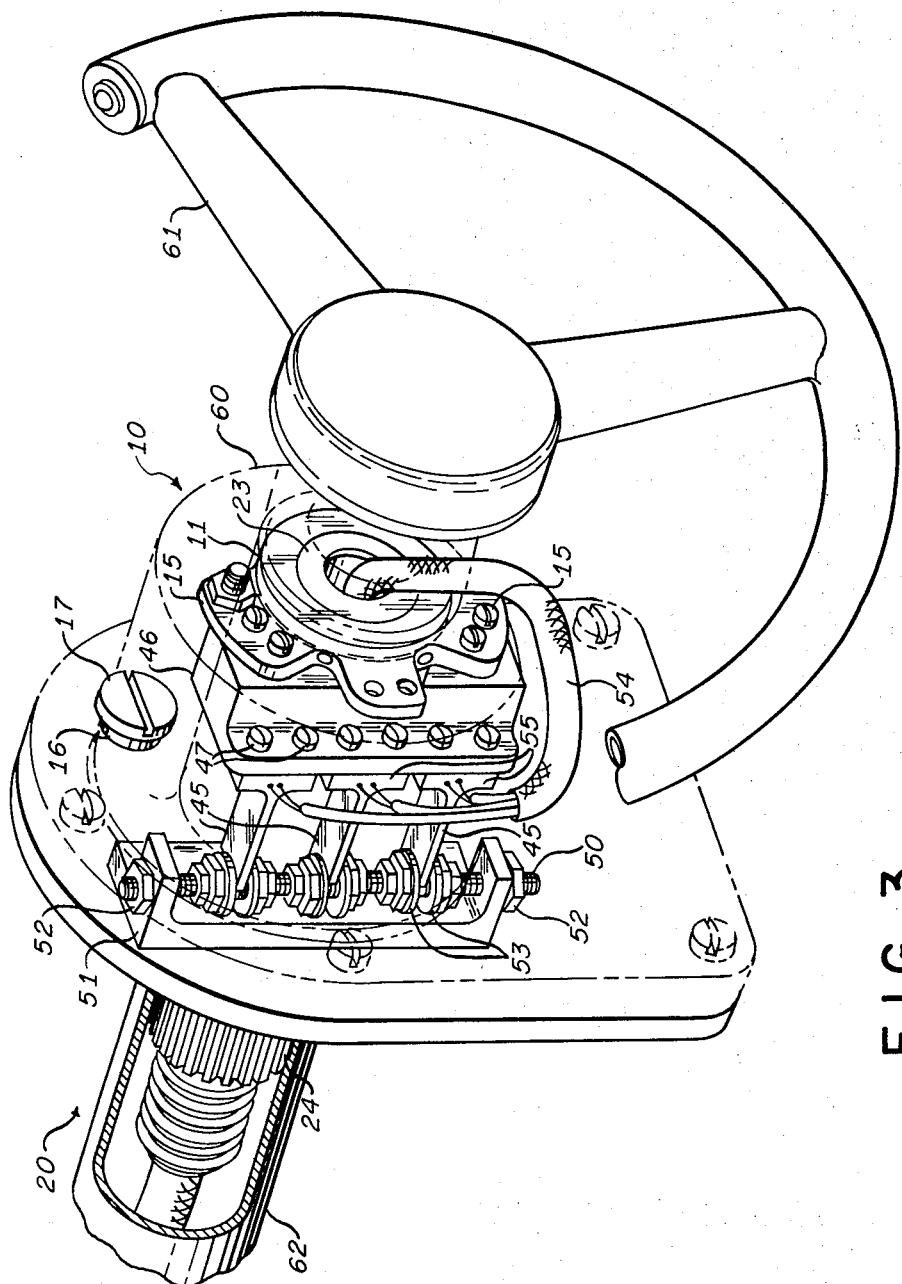
FIG. 3 is an isometric view of the roll load beams shown mounted to the assembly of the primary pitch and roll flexures.

In FIG. 3, three cantilevered roll load beams 45 are shown attached to the assembly of the pitch flexure 10 and the roll flexure 20. One end of each of the roll load beams 45 is rigidly mounted by screws 47 to a bracket 46 which is in turn affixed to the two smaller mounting flanges 15 on the cylindrical member 11. Each of the free ends of the beams 45 has a hole in which is inserted a small ball 38 in a manner similar to that described for the beams 30 and shown in FIG. 5. The ball 38 on the free end of the beam is positioned between two flat nuts 53 which are positioned at predetermined locations along a threaded shaft 50 serving as limit stops for the free ends of the beams 45. The threaded shaft 50 is secured to a second bracket 51 by nuts 52. The second bracket 51 is mounted on the two raised sections 26 of the mounting plate 22 by screws (not shown). A plurality of wires 54 conduct the electrical output signals from the roll strain gages 55 through the torsion bar 21 along with the wires 37 from the pitch strain gages 40 to the signal processing unit (not shown). Also shown in FIG. 3 is the assembly of the pitch flexure 10, the roll flexure 11 and the roll load beams 45 mounted in the hub 60 of the aircraft control wheel 61 and the spline 24 on the roll flexure 11 firmly secured in the control column 62.

The operation of the invention will be described with reference to FIGS. 2 and 3. To initiate a pitch maneuver of the aircraft, the pilot places his hands on the control wheel 61 and either pushes forward to cause descent or pulls backward to cause ascent. The force is applied along an axis that is parallel with the axis of the control column 62 and is transmitted through the hub 60, the mounting flange 12 and the cylindrical member 11 to the curved beams 14 of the pitch flexure 10. In reaction to the forward or backward applied forces, the curved beams 14 will extend or compress respectively resulting in differential translational motion between the small mounting flange 15 end and the large flange 12 end of the cylindrical member 11. The curved beams 14 react because they are compliant when axial loads are applied between the two flanged ends of the cylindrical member 11.

The inside diameter of the cylindrical member 11 and the outside diameter of the torsion bar 21 form the outer and inner races respectively of a linear/roller bearing. This bearing permits the flange end 12 of the cylindrical member 11 to have 2° of freedom, pitch and roll, and the opposite end to have 1° of freedom, roll. Therefore, the curved beams 14 extend or compress in reaction to the applied pitch forces. The cantilevered pitch load beams 30 which bridge the curved beams 14 tend to deflect when the curved beams 14 are extended or compressed. Since the three beams 30 are in parallel, the amount of deflection experienced by each beam is the same. If the physical displacement in the beams 30 is relatively small, the pitch strain gages 40 operate at a low level and produce identical electrical output signals.

To initiate a turn or roll command to the right, the pilot turns the control wheel 61 in a clockwise direction and to initiate a roll command to the left, he turns the wheel in a counterclockwise direction. These turn commands are tangential forces applied to the control wheel 61 which are coupled into the mounting flange 12. Since both the mounting flange and the cylindrical member 11 are free to roll, and the curved beams 14 are non-compliant when torsion loads are applied between the two flanged ends of cylindrical member 11, they do not react to torque loads but rather transmit them to the collar 23 without rotational differential motion between the ends of the cylindrical member 11. The collar 23 on the torsion bar 21 is pinned to one end of the cylindrical member 11. Therefore, it rotates when the cylindrical member 11 rotates. However, the opposite end of the torsion bar 21 is held stationary since it is rigidly secured to the stationary control column 62 through the male spline 24. As a result, the torsion bar 21 reacts to substantially all of the torque load applied to the control wheel 61 when the pilot initiates a turn command.

The parallel cantilevered roll load beams 45 operate a similar manner to the cantilevered pitch load beams 30. The roll beams 45 have one end of each beam coupled through bracket 46 and the pitch flexure 10 to the collar 23 which is the rotatable end of the torsion bar 21. The other ends of the roll beams 45 are coupled through the second bracket 51 and the raised sections 26 to the stationary end of the torsion bar 21. Therefore, when the torsion bar 21 twists in reacting to applied torque loads, the roll beams 45 deflect. Since the roll beams 45 are in parallel, the amount of deflection experienced by each beam is the same. By maintaining the physical displacement of the beams relatively small, the roll strain gages 55 operate at a low level and produce identical electrical output signals.

In a typical assembly incorporating the invention, the curved beams 14 and the torsion bar 21 reacted to approximately 95 percent of the applied pitch and roll forces, respectively, while the pitch load beams 30 which bridge the curved beams 14 and the roll load beams 45 which bridge the torsion bar 21 reacted to the remaining 5 percent of the applied pitch and roll forces.

During the operation of an aircraft a pilot may rest his hands on the control wheel 61 creating low level forces. If compensation for these forces is not furnished, the force sensors will react to them and provide erroneous pitch and roll command output signals. In most sensor devices employing transducers bonded to the primary flexures it is necessary to create electronically a dead zone in which there is no reaction to these forces because the primary flexures react directly to these forces and the transducers will provide an output which is a function of the flexure reaction. In addition, the transducers are subject to cross-coupling effects produced in the primary flexures. However, the limit stops to the present invention disposed at the free ends of the pitch load beams 30 and the roll load beams 45 provide an adjustable threshold setting which must be exceeded before a pitch or roll command output signal is generated. These limit stops function independently of the strain gages therefore the strain gages are operable over their entire range of sensitivity since they are not required to provide a dead zone. Also the limit stops may be adjusted for any threshold value throughout the range from zero pounds up to the established limits set by the hard stop member 17. Further, the disclosed configuration of the primary pitch and roll flexures and the pitch and roll load beams eliminates cross-coupling effect in the strain gages and increases the accuracy of the command output signals.

While the invention has been described in its preferred embodiment, it is to be understood that the words which have been used are words of description rather than limitation and that changes may be made without departing from the true scope and spirit of the invention in its broader aspects.

I claim:

1. A plurality of force sensors for steering control mounted in the hub of an aircraft control wheel which is affixed to a control column comprising
    pitch flexure means disposed within said hub coaxial with said column for reacting to a substantial portion of only those forces applied parallel to the axis of said wheel,
    an assembly of pitch load beams coupled to said pitch flexure means which react to the remaining portion of said coaxially applied forces to produce redundant mechanical displacements in accordance with the magnitude of said axially applied forces,
    load flexure means disposed within said hub coaxial with said column and concentric with said pitch flexure means for reacting to a substantial portion of only those forces applied tangentially to said wheel,
    a plurality of roll load beams coupled to said load flexure means which react to the remaining portion of said tangentially applied forces to produce redundant mechanical displacements in accordance with the magnitude of said tangentially applied forces, and
    transducer means affixed to said pitch and roll beams for transforming said mechanical displacements into isolated pitch and roll electrical output signals indicative of said coaxially and tangentially applied forces.

2. A plurality of force sensors as described in claim 1 in which bearing means are positioned between said pitch flexure means and said roll flexure means to permit said pitch flexure means to transmit only tangentially applied forces to said roll flexure means.

3. A plurality of force sensors as described in claim 1 in which said pitch flexure means includes a section coaxial with said column having one end proximate said column and a cantilevered section at the end opposite said column for reacting only to said axially applied forces.

4. A plurality of force sensors as described in claim 1 in which said pitch load beams include cantilevered beams coupled between each end of said pitch flexure means for producing mechanical displacements in response to said axially applied forces.

5. A plurality of force sensors as described in claim 1 in which said roll flexure means includes a torque responsive section coaxial with said column and concentric with said pitch flexure means for reacting only to said tangentially applied forces.

6. A plurality of force sensors as described in claim 1 in which said roll load beams include cantilevered beams coupled between each end of said roll flexure means for providing mechanical displacements as a result of said tangentially applied forces.

7. A plurality of force sensors as described in claim 1 in which said pitch flexure means includes a cylindrical portion coaxial with said column having a mounting flange at one end and curved beams machined near the end opposite said mounting flange for reacting only to said axially applied forces, said pitch load beams including cantilevered beams each having one end rigidly coupled to said cylindrical portion of said pitch flexure means with said mounting flange and having the other end coupled to said end opposite said mounting flange thereby bridging said curved beams for producing said redundant mechanical displacements, said roll flexure means includes a torsion bar coaxial with said column and concentric with said cylindrical portion of said pitch flexure means having one end rigidly coupled to said column and the end opposite said column affixed to said pitch flexure means at said end opposite said flange, said roll load beams include cantilevered beams each having one end coupled to said roll flexure means at said end coupled to said column and the other end rigidly coupled to said pitch flexure means at the opposite said mounting flange, and bearing means disposed between said pitch flexure means and said roll flexure means for providing 2° of freedom to said pitch flexure means at said flange mounted end and 1° of freedom to said end opposite said flange mounted end.

8. A plurality of force sensors as described in claim 7 in which said bearing means includes roller bearings positioned along the length of said torsion bar and of proper size to eliminate radial movement between said torsion bar and said cylindrical portion of said pitch flexure means.

9. A plurality of force sensors as described in claim 1 in which said transducer means include semiconductor strain gages affixed to said pitch and roll load beams for transforming said mechanical displacements into electrical output signals.

10. A plurality of force sensors as described in claim 1 in which said transducer means include deposited strain gages disposed on said pitch and roll load beams for transforming said mechanical displacements into electrical output signals.

* * * * *